(12) United States Patent
Inase

(10) Patent No.: US 11,174,913 B2
(45) Date of Patent: Nov. 16, 2021

(54) TRANSMISSION BELT

(71) Applicant: TOYOTA JIDOSHA KABUSHIKI KAISHA, Toyota (JP)

(72) Inventor: Yu Inase, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 412 days.

(21) Appl. No.: 16/217,125

(22) Filed: Dec. 12, 2018

(65) Prior Publication Data
US 2019/0234486 A1 Aug. 1, 2019

(30) Foreign Application Priority Data
Jan. 31, 2018 (JP) .............................. JP2018-014832

(51) Int. Cl.
*F16G 5/16* (2006.01)

(52) U.S. Cl.
CPC ...................... *F16G 5/16* (2013.01)

(58) Field of Classification Search
CPC ..... F16G 5/16; F16G 1/26; F16G 3/14; F16H 9/125; F16H 61/662
See application file for complete search history.

(56) References Cited

U.S. PATENT DOCUMENTS

2003/0040387 A1* 2/2003 Kanehara ................... F16G 5/16
  474/242
2010/0016113 A1* 1/2010 Kobayashi ................ F16G 5/16
  474/261
2011/0237376 A1* 9/2011 Sano ......................... F16G 5/16
  474/242
2019/0154112 A1* 5/2019 Ochi ........................ F16G 5/16
2019/0154113 A1* 5/2019 Sato ......................... F16G 5/16
2019/0154114 A1* 5/2019 Ochi ........................ F16G 5/16
2019/0195315 A1* 6/2019 Ochi ........................ F16G 5/16

FOREIGN PATENT DOCUMENTS

| CN | 1279364 A | 1/2001 |
| EP | 1 067 311 A1 | 1/2001 |
| JP | 2012-127510 A | 7/2012 |
| WO | 2017/200057 A1 | 11/2017 |

* cited by examiner

*Primary Examiner* — Michael R Mansen
*Assistant Examiner* — Juan J Campos, Jr.
(74) *Attorney, Agent, or Firm* — Oliff PLC

(57) ABSTRACT

A transmission belt includes: a plurality of elements, each having a plate shape, arranged sequentially in a ring manner; and a single-line ring having a belt shape and binding the elements together in a ring. Further, each of the elements includes pillar portions so that the single-line ring is inserted and a locking edge, provided on one surface in a plate thickness direction of the element, indicating a boundary region from which a plate thickness of the element changes, the pillar portions have respective ends, the ends having portions in a curved shape each having a predetermined curvature radius along a plane parallel to the single-line ring, and the portions in the curved shape include a first portion being formed on a front side at one end of the inner space, and a second portion being formed on a rear side at another end of the inner space.

4 Claims, 8 Drawing Sheets

TRANSMISSION BELT

CROSS-REFERENCE TO RELATED APPLICATION(S)

The present application claims priority to and incorporates by reference the entire contents of Japanese Patent Application No. 2018-014832 filed in Japan on Jan. 31, 2018.

BACKGROUND

The present disclosure relates to a transmission belt.

Japanese Laid-open Patent Publication No. 2012-127510 discloses a configuration of a belt-type continuously variable transmission in which an angular difference is provided between a rotational axis direction of a first pulley and a rotational axis direction of a second pully such that an angle between both left and right side surfaces in a width direction of a belt of an element and a groove surface of the first pully or the second pully approximates a normal angle between the both left and right side surfaces and the groove surface in a state without misalignment in a case where the misalignment that the element enters the groove of the first pulley or the second pulley with inclination with respect to a surface including a central axis of the first pully or the second pully occurs in a state where a central portion in a groove width direction of the first pully and a central position in a groove width direction of the second pully are relatively shifted during travel of a belt. This makes it possible to correct an attitude of the element with respect to the pulley and to suppress wear of the element and the pulley.

In the above-described related-art technology, as a transmission belt, a large number of plate-shaped elements are arranged in an annular shape with their orientations aligned, and the large number of elements are bound by two rings. The two rings are inserted into a slit formed of a head and a neck of each element. On the other hand, in order to reduce cost, a transmission belt is proposed in which a ring is a single-line ring and a concave portion into which a ring of each element is fitted is provided.

However, when the transmission belt using the above-described single-line ring is used, since the number of rings is decreased from two to one, an allowed misalignment amount in the ring decreases and an inner portion of a pillar in a concave portion of the element and a side end of the ring is more likely to come into contact with each other. When the inner portion of the pillar and the side end of the ring come into contact with each other, there is a possibility that stress acts on in the side end of the ring or wear occurs in the ring.

SUMMARY

There is a need for providing a transmission belt formed of a single-line ring capable of preventing contact of a pillar of an element with a side end of a ring caused by misalignment.

A transmission belt includes: a plurality of elements, each having a plate shape, arranged sequentially in a ring manner; and a single-line ring having a belt shape and binding the elements together in a ring. Further, each of the elements includes pillar portions so that the single-line ring is inserted between the pillar portions and a locking edge, provided on one surface in a plate thickness direction of the element, indicating a boundary region from which a plate thickness of the element changes, the pillar portions have respective ends, which form an inner space between the ends so that the single-line ring is inserted in the inner space, the ends having portions in a curved shape each having a predetermined curvature radius along a plane parallel to the single-line ring, and the portions in the curved shape include first and second portions, the first portion being formed on a front side, where the locking edge is provided, at one end of the inner space, and the second portion being formed on a rear side, where the locking edge is not provided, at another end of the inner space.

DETAILED DESCRIPTION

An embodiment of the present disclosure is hereinafter described with reference to the accompanied drawings. Note that the same reference signs are used to describe the same or corresponding parts throughout the drawings of the embodiment below. The present disclosure is not limited to the embodiment described below.

Figure 1A:
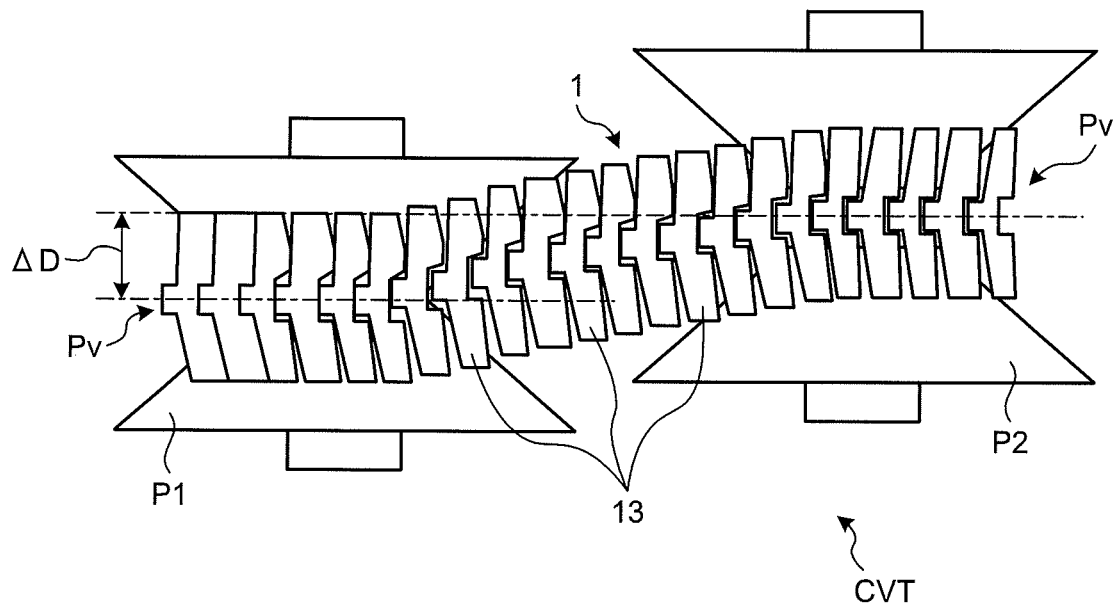
FIG. 1A is a top view of a belt transmission device in which a transmission belt according to an embodiment of the present disclosure is wound around a pulley of a belt-type continuously variable transmission.
Figure 1B:
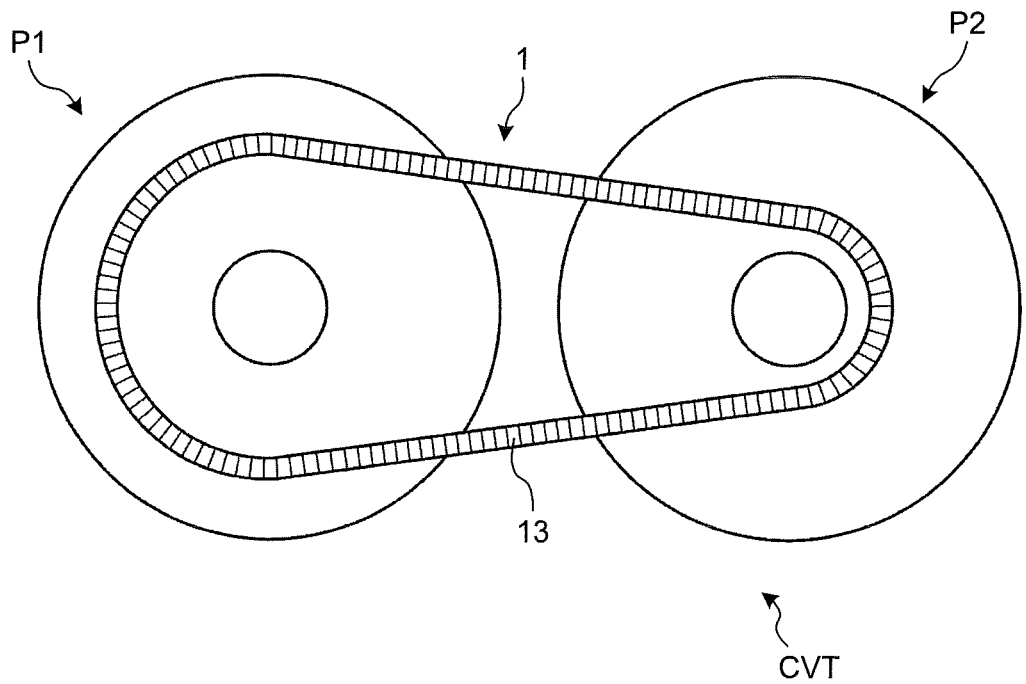
FIG. 1B is a side view of the belt transmission device of FIG. 1.
Figure 2:
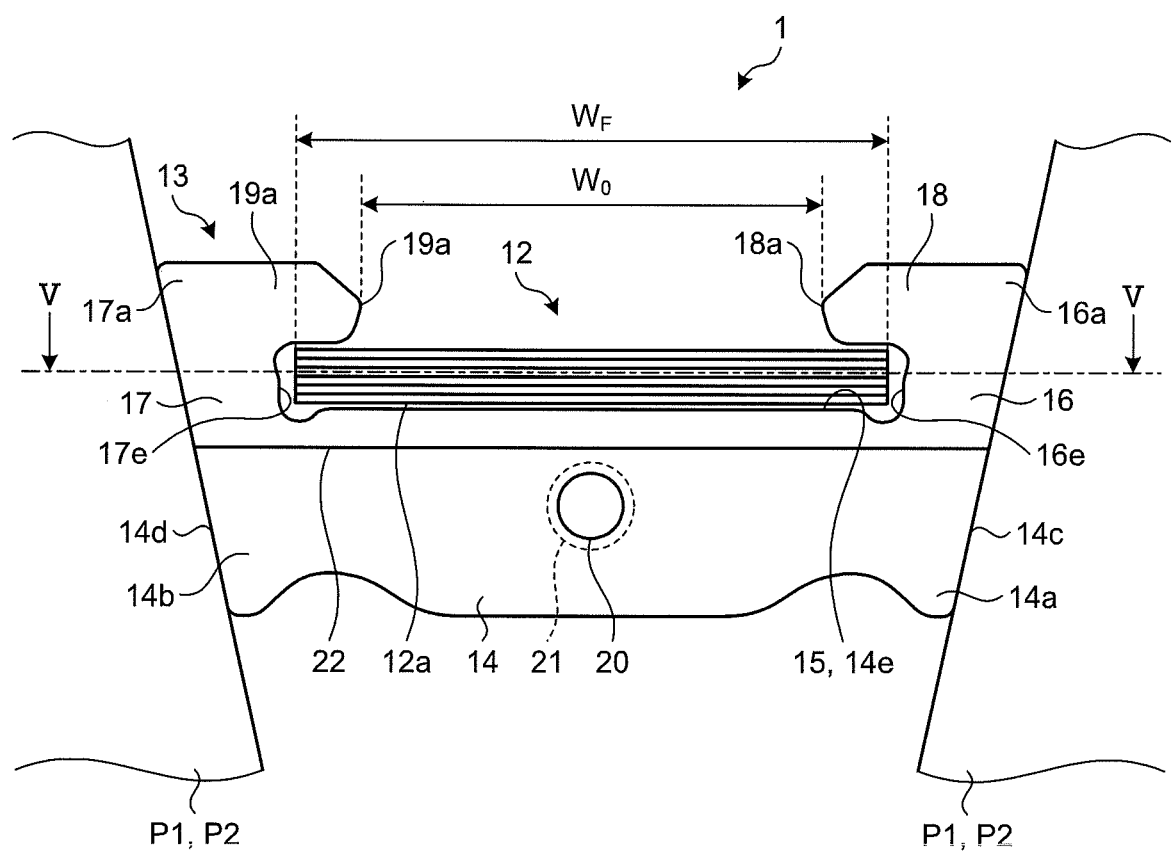
FIG. 2 is a front view illustrating a configuration of an element of the transmission belt and a cross-sectional view illustrating a configuration of a single-line ring according to an embodiment of the present disclosure.
Figure 3:
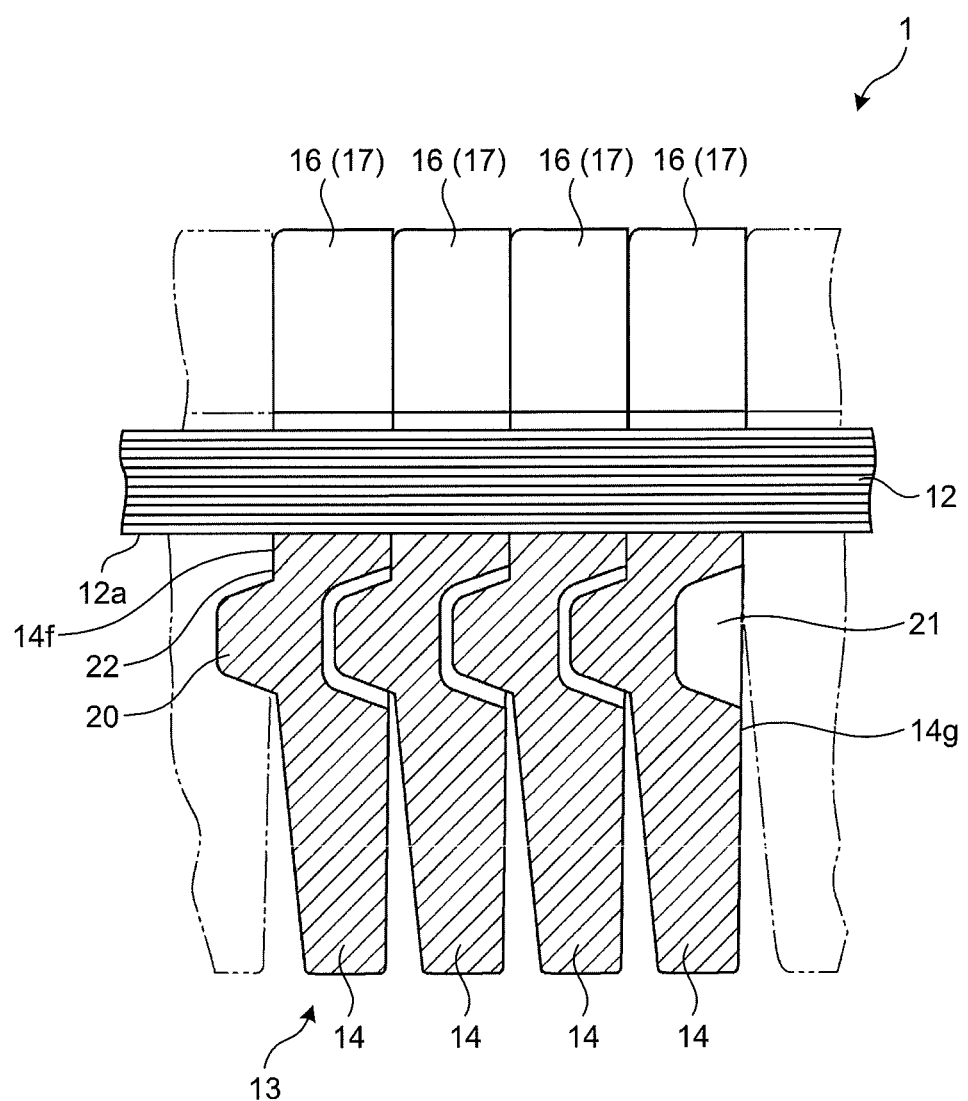
FIG. 3 is a side view including a partial cross-section illustrating the configuration of the element and the single-line ring of the transmission belt according to an embodiment of the present disclosure.
Figure 4:
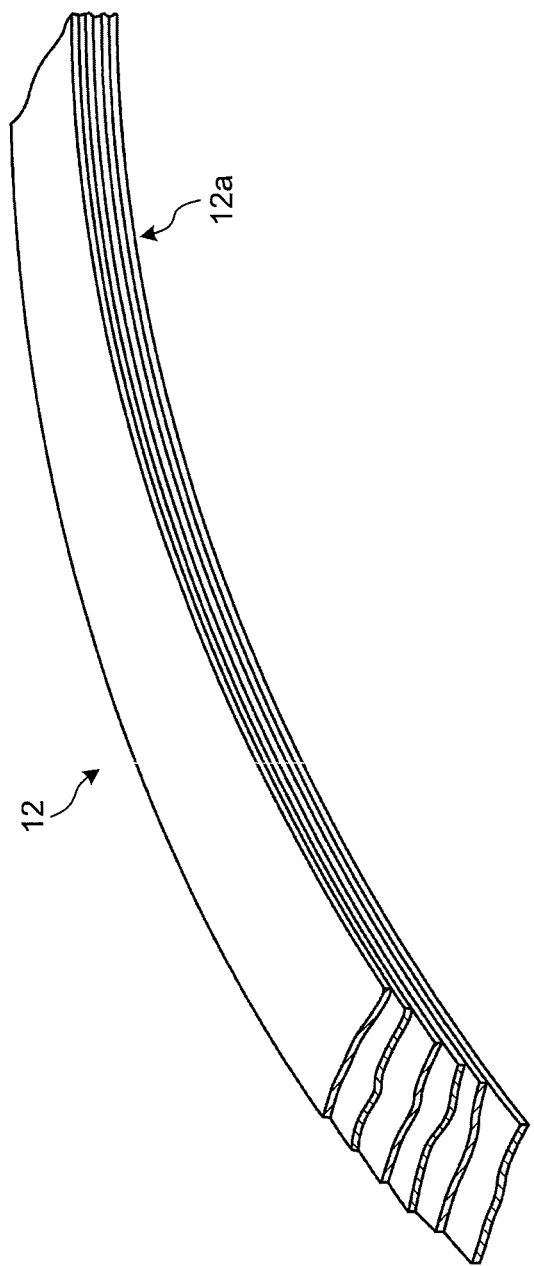
FIG. 4 is a perspective cross-sectional view illustrating the configuration of the single-line ring in the transmission belt according to an embodiment of the present disclosure.

First, a transmission belt according to an embodiment of the present disclosure is described. FIGS. 1A and 1B are top view and side view illustrating a belt transmission device around which a transmission belt according to the embodiment is wound. FIG. 2 is a front view illustrating a configuration of an element and a cross-sectional view illustrating a configuration of a single-line ring in the transmission belt according to the embodiment. FIG. 3 is a side view including a partial cross-section illustrating the configurations of the element and the single-line ring in the transmission belt according to the embodiment. FIG. 4 is a perspective cross-sectional view illustrating the configuration of the single-line ring in the transmission belt according to the embodiment of the present disclosure.

A transmission belt 1 according to the embodiment is used as a V belt of the belt transmission device which transmits power between two pulleys. Specifically, for example, as illustrated in FIGS. 1A and 1B, the transmission belt 1 is wound around pulley grooves Pv of a driving pulley P1 and a driven pulley P2 of a belt-type continuous variable transmission mounted on a vehicle. The transmission belt 1 transmits a torque by a frictional force generated between the driving pulley P1 and the driven pulley P2.

As illustrated in FIGS. 1, 2, and 3, the transmission belt 1 is provided with a belt-shaped hoop 12 and a large number of, for example, several hundreds of plate-shaped elements 13. The transmission belt 1 is formed by arranging a large number of elements 13 in order such that their attitudes are aligned and binding them in an annular shape by the hoop 12.

The hoop 12 as the single-line ring is a member for binding a large number of elements 13 in an annular shape to hold the elements 13. The hoop 12 is required to have both flexibility and tensile strength when the transmission belt 1 is wound around and between the driving pulley P1 and the driven pulley P2. Sufficient flexibility for freely changing a winding diameter is required as the flexibility of the transmission belt 1. Sufficient tensile strength capable of resisting transmission torque and clamping force received from the driving pulley P1 and the driven pulley P2 at the time of power transmission is required as the tensile strength of the transmission belt 1. Therefore, as illustrated in FIG. 4, the hoop 12 is formed by laminating a plurality of flexible metallic belt-shaped members such as steel bands in a thickness direction of the belt-shaped member.

The element 13 is formed of, for example, a metallic plate-shaped member. The element 13 includes, as main components, a base portion 14, a saddle surface 15, a first pillar portion 16, a second pillar portion 17, a first hook portion 18, a second hook portion 19, a boss portion 20, and a dimple portion 21.

The base portion 14 serves as a main body portion of the element 13. One end of the base portion 14 in the width direction of the element 13 (horizontal direction in FIG. 2) is a first end 14a. The other end of the base portion 14 in the width direction of the element 13 is a second end 14b. In the element 13 of FIG. 2, a right end of the base portion 14 is the first end 14a and a left end thereof is the second end 14b. An end face 14c of the first end 14a and an end face 14d of the second end 14b are formed of inclined surfaces inclined with respect to corresponding tapered surfaces of the pulley groove Pv. The end faces 14c and 14d being so-called flank surfaces of the element 13 are brought into frictional contact with the pulley grooves Pv to transmit the torque between the driving pulley P1 and driven pulley P2 and the transmission belt 1.

The saddle surface 15 is brought into contact with an inner peripheral surface 12a of the hoop 12 in a state where the hoop 12 is assembled onto the elements 13. The saddle surface 15 is formed on an end face 14e on an upper end side of the base portion 14 in a height direction of the element 13 (vertical direction in FIGS. 2 and 3). Specifically, the saddle surface 15 is formed on the end face 14e between the first pillar portion 16, provided on the first end 14a of the base portion 14, and the second pillar portion 17 provided on the second end 14b. The hoop 12 is inserted through an inner portion of the pillar portion between an inner wall surface 16e of the first pillar portion 16 and an inner wall surface 17e of the second pillar portion 17.

The first pillar portion 16 is provided on the first end 14a of the base portion 14 in a state of rising on the saddle surface 15. The first pillar portion 16 is integrally formed with the base portion 14. The first end 14a is a peripheral portion including the end face 14c on one end (right side in FIG. 2) of the base portion 14 in the width direction of the element 13. The first pillar portion 16 is formed so as to extend obliquely upward in a height direction from the first end 14a including the end face 14c. That is, the first pillar portion 16 is provided so as to extend upward continuously from the end face 14c with an inclined surface of an inclination angle similar to that of the end face 14c.

Note that the first pillar portion 16 does not necessarily include the end face 14c. For example, the first pillar portion 16 may be provided so as to extend upward in the height direction substantially perpendicular to the saddle surface 15 from the first end 14a without including the end face 14c. The first pillar portion 16 may also be provided so as to stand upward without being continuous with the end face 14c. Furthermore, the first pillar portion 16 may also be provided so as to stand upward from a position shifted toward a central side of the element 13 from the end face 14c.

The second pillar portion 17 is provided on the second end 14b of the base portion 14 in a state of rising on the saddle surface 15. The second pillar portion 17 is integrally formed with the base portion 14. The second end 14b is a peripheral portion including the end face 14d of the other end (left side in FIG. 2) of the base portion 14 in the width direction of the element 13. The second pillar portion 17 is formed so as to extend obliquely upward in the height direction from the second end 14b including the end face 14d. That is, the second pillar portion 17 is provided so as to extend upward continuously from the end face 14d with an inclined surface of an inclination angle similar to that of the end face 14d.

Note that the second pillar portion 17 does not necessarily include the end face 14d. For example, the second pillar portion 17 may be provided so as to extend upward in the height direction substantially perpendicular to the saddle surface 15 from the second end 14b without including the end face 14d. The second pillar portion 17 may also be provided so as to stand upward without being continuous with the end face 14d. Furthermore, the second pillar portion 17 may also be provided so as to stand upward from a position shifted toward a central side of the element 13 from the end face 14d.

The first hook portion 18 is provided so as to extend from the first pillar portion 16 toward a central side of the base portion 14 in the width direction of the element 13. Specifically, the first hook portion 18 protrudes from an upper end 16a of the first pillar portion 16 in a height direction of the base portion 14 toward the central side of the base portion 14. The first hook portion 18 is integrally formed with the first pillar portion 16 and the base portion 14.

The second hook portion 19 is provided so as to extend from the second pillar portion 17 toward the central side of the base portion 14 in the width direction of the element 13. Specifically, the second hook portion 19 protrudes from an upper end 17a of the second pillar portion 17 in the height direction of the base portion 14 toward the central side of the base portion 14. The second hook portion 19 is integrally formed with the second pillar portion 17 and the base portion 14.

The boss portion 20 and the dimple portion 21 are provided on the base portion 14 of the element 13. The boss portion 20 is provided in a central portion of the base portion 14 of the element 13. Specifically, the boss portion 20 protrudes outward from a front surface 14f on a front side in a plate thickness direction of the base portion 14 (horizontal direction in FIG. 3). The boss portions 20 are adjacent to each other in a state where the elements 13 and the hoop 12 are assembled with each other. The dimple portion 21 is formed in the central portion of the base portion 14 of the element 13. Specifically, the dimple portion 21 is formed of a concave portion recessed inward from a rear surface 14g on a rear side in the plate thickness direction of the base portion 14. The dimple portion 21 is formed so as to be loosely fitted to the boss portion 20 of another element 13 which is adjacent in the state where the elements 13 and the hoop 12 are assembled. Therefore, in the transmission belt 1, the boss portion 20 and the dimple portion 21 are fitted to each other between the elements 13 adjacent to each other in a circumferential direction of the hoop 12.

When the boss portion 20 and the dimple portion 21 are fitted to each other, the positions of the elements 13 adjacent to each other are determined so that relative movements of the adjacent elements 13 in the width direction (horizontal direction in FIG. 3) and in the height direction (vertical direction in FIG. 3) of the element 13 are restricted. In the example as illustrated in FIGS. 2 and 3, the boss portion 20 and the dimple portion 21 are fitted to each other in a single site in the vicinity of the central portion of the element 13. Accordingly, the relative movements between the adjacent elements 13 in the width direction and in the height direction of the element 13 as described above are restricted, whereas a relative rotation around the fitting portion between the boss portion 20 and the dimple portion 21 becomes possible. Therefore, when assembling the element 13 and the hoop 12 and the like, it is possible to relatively rotate the elements 13 to easily realize a state where the element 13 is inclined with respect to the hoop 12. Therefore, an assembling property of the element 13 and the hoop 12 is improved.

In addition, the elements 13 are bound by the hoop 12 in a manner that the elements 13 are arranged in an annular manner and in an aligned manner and are wound around the driving pulley P1 and the driven pulley P2. Therefore, in a state where the transmission belt 1 is wound around and between the driving pulley P1 and the driven pulley P2, it is necessary that the lines of a large number of elements 13 spread in a fan shape with respect to the centers of the driving pulley P1 and the driven pulley P2 and the elements 13 are in close contact with each other. Therefore, a lower portion of the base portion 14 in the height direction of the element 13 is formed to be thin. Specifically, a locking edge 22 is provided in a predetermined position lower than the saddle surface 15 on the front surface 14f on one side of the base portion 14 in the plate thickness direction. The locking edge 22 being a boundary region where the plate thickness of the element 13 changes is provided on the front surface 14f on one side in the plate thickness direction. The base portion 14 is such that a plate thickness of a portion on an inner peripheral side than the locking edge 22 starting from the locking edge 22 is reduced. Therefore, in a state where the transmission belt 1 is wound around the driving pulley P1 and the driven pulley P2 and the lines of a large number of elements 13 spread in the fan shape, the locking edge 22 is brought into contact with the rear surface 14g on the other side of the base portion 14 in the plate thickness direction of another adjacent element 13.

As illustrated in FIG. 2, the transmission belt 1 according to the embodiment is formed in a manner that an opening width $W_O$ between a tip end 18a of the first hook portion 18 and a tip end 19a of the second hook portion 19 is less than a width $W_F$ of the hoop 12. The tip end 18a and the tip end 19a face each other in the width direction of the element 13. The opening width $W_O$ refers to a dimension between the tip end 18a and the tip end 19a and further refers to a distance of a portion in which a space between the tip end 18a and the tip end 19a in the width direction of the element 13 becomes the narrowest. Since the opening width $W_O$ of the element 13 is less than the width $W_F$ of the hoop 12, it is possible to prevent the element 13 from being dropped from the hoop 12 in the state where the elements 13 and the hoop 12 are assembled.

As illustrated in FIGS. 1A and 1B, in a belt-type Continuously Variable Transmission CVT, the transmission belt 1 is wound around the pulley groove Pv formed of a fixed sheave and a movable sheave in each of the driving pulley P1 and the driven pulley P2. As the movable sheaves in the driving pulley P1 and the driven pulley P2 move in an axial direction of the pulley (vertical direction in FIG. 1), a width of the pulley groove Pv continuously changes and steplessly changes a gear ratio. In a case of changing the width of the pulley groove Pv, thrust forces are applied to the movable sheaves of the driving pulley P1 and the driven pulley P2 by a hydraulic actuator or the like. A misalignment occurs in the transmission belt 1 between the driving pulley P1 and the driven pulley P2 according to the change in width of the pulley groove Pv of the driving pulley P1 and the driven pulley P2. The misalignment refers to a deviation in the axial direction of the pulley of the transmission belt 1 between the driving pulley P1 and the driven pulley P2, and a misalignment amount is denoted by ΔD in FIG. 1A.

Figure 5:
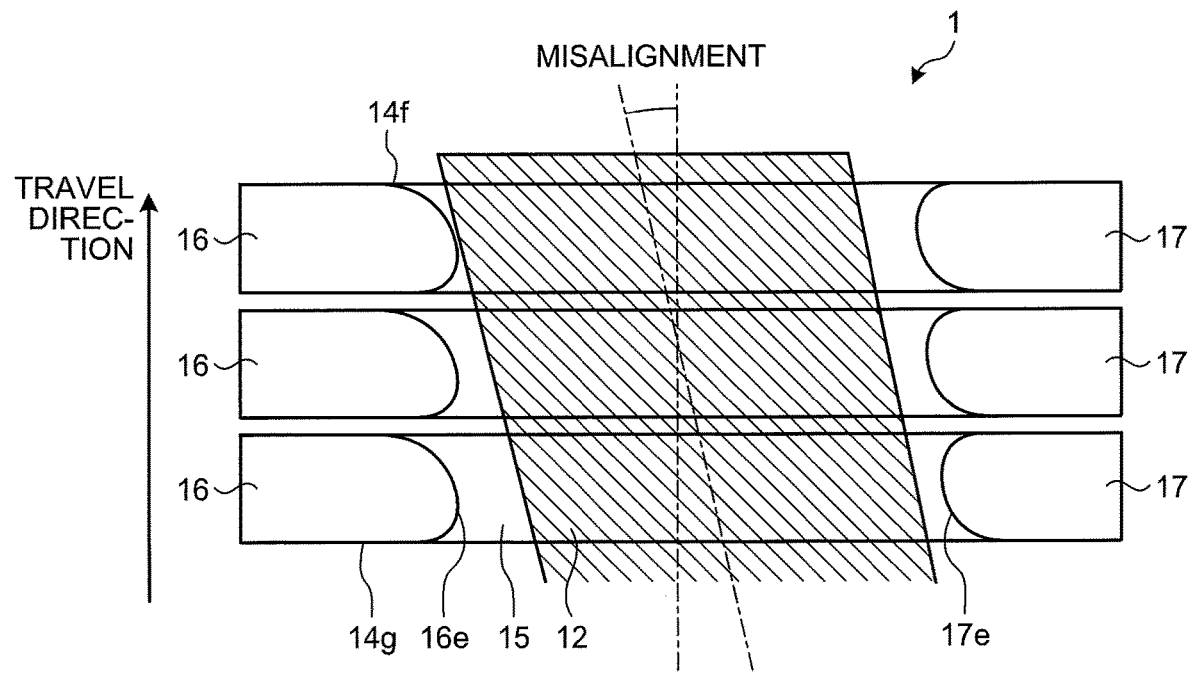
FIG. 5 is a schematic diagram of a cross-section taken along line V-V illustrated in FIG. 2 in a plurality of elements through which a belt is inserted according to an embodiment of the present disclosure.

FIG. 5 is a schematic diagram of a cross-section taken along line V-V illustrated in FIG. 2 in the elements 13 through which the hoop 12 is inserted. As illustrated in FIG. 5, the hoop 12 is inserted through an inner portion between the first pillar portion 16 and the second pillar portion 17 in each of the elements 13. As described above, when the misalignment occurs in the transmission belt 1, a phenomenon occurs that the hoop 12 inclines in the inner portion between the first pillar portion 16 and the second pillar portion 17. Therefore, in this embodiment, a portion in a curved shape having a predetermined curvature radius along a plane parallel to the hoop 12 is provided on the inner wall surfaces 16e and 17e which are the ends of the inner portion of the first pillar portion 16 and the second pillar portion 17, respectively.

Figure 6:
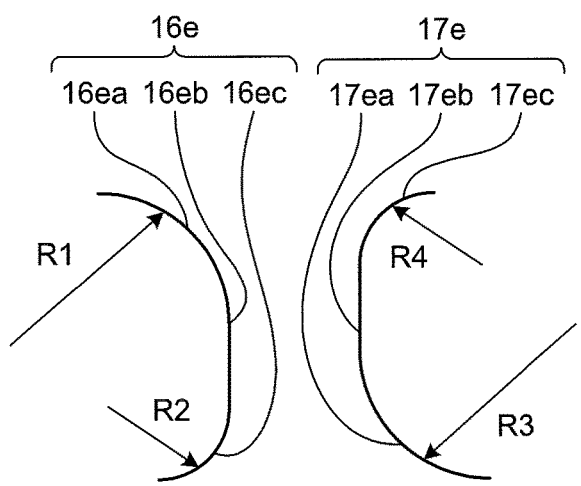
FIG. 6 is a schematic diagram illustrating shapes of inner portions of first and second pillar portions according to an embodiment of the present disclosure.

FIG. 6 is a schematic diagram illustrating the shapes of the inner portions of the first pillar portion 16 and the second pillar portion 17 according to the embodiment. As illustrated in FIGS. 5 and 6, the inner wall surface 16e of the inner portion of the first pillar portion 16 is formed of a first curved portion 16ea, a first linear portion 16eb, and a second curved portion 16ec. The first curved portion 16ea is formed into a curved shape having a first curvature radius R1 along a surface direction of the hoop 12, that is, a surface direction of the saddle surface 15. The first curved portion 16ea is provided on a side of the front surface 14f on which the locking edge 22 is provided in the element 13. The second curved portion 16ec is formed into a curved shape having a second curvature radius R2 along the surface direction of the saddle surface 15. The second curved portion 16ec is provided on a side of the rear surface 14g on which the locking edge 22 is not provided in the element 13. The first linear portion 16eb is formed into a linear shape continuously, smoothly, and linearly connecting the first curved portion 16ea and the second curved portion 16ec.

Similarly, the inner wall surface 17e of the inner portion of the second pillar portion 17 is formed of a third curved portion 17ea, a second linear portion 17eb, and a fourth curved portion 17ec. The third curved portion 17ea is formed into a curved shape having a third curvature radius R3 along the surface direction of the saddle surface 15. The third curved portion 17ea is provided on the side of the rear surface 14g on which the locking edge 22 is not provided in the element 13. The fourth curved portion 17ec is formed into a curved shape having a fourth curvature radius R4 along the surface direction of the saddle surface 15. The fourth curved portion 17ec is provided on the side of the front surface 14f on which the locking edge 22 is provided in the element 13. The second linear portion 17eb is formed into a linear shape continuously, smoothly, and linearly connecting the third curved portion 17ea and the fourth curved portion 17ec.

In this embodiment, the first curvature radius R1 on the side of the front surface 14f is greater than the second curvature radius R2 on the side of the rear surface 14g on the inner wall surface 16e in the first pillar portion 16, which is one end of the inner portion through which the hoop 12 is inserted (R1>R2). Also, the fourth curvature radius R4 on the side of the front surface 14f is less than the third curvature radius R3 on the side of the rear surface 14g on the inner wall surface 17e in the second pillar portion 17, which is the other end of the inner portion through which the hoop 12 is inserted (R3>R4). A reason of the relationship among the first to fourth curvature radii R1 to R4 is described below.

Figure 7:
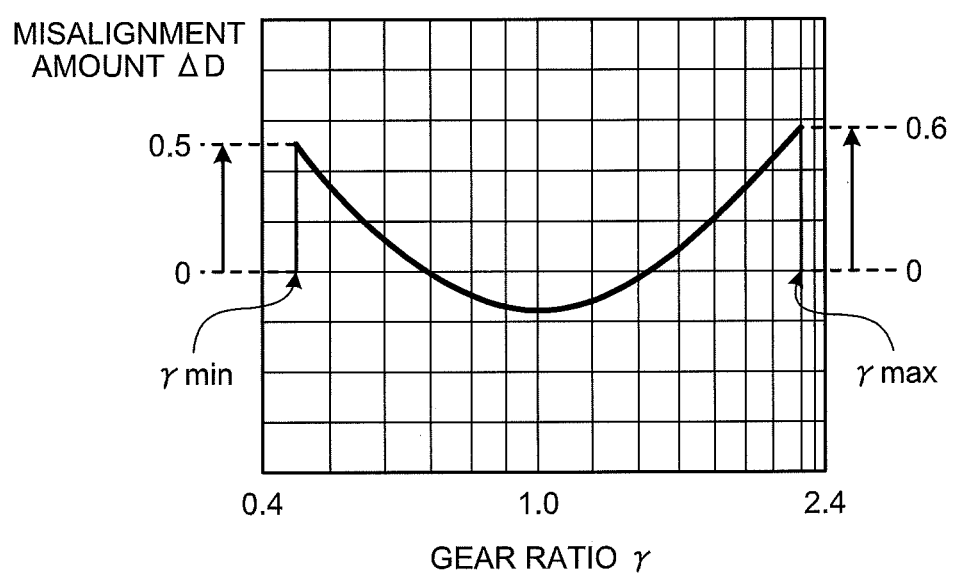
FIG. 7 is a graph illustrating a misalignment amount of the transmission belt with respect to a gear ratio of the belt-type continuously variable transmission.

FIG. 7 is a graph illustrating an example misalignment amount ΔD of the transmission belt 1 with respect to a gear ratio γ of the belt-type continuously variable transmission CVT. FIGS. 8A, 8B and 8C, 8D are schematic diagrams illustrating states of the transmission belt 1 in cases where the gear ratio γ of the belt-type continuously variable transmission CVT is a maximum gear ratio γmax and a minimum gear ratio γmin, respectively. As illustrated in FIG. 7, in the belt-type continuously variable transmission CVT, the misalignment amount ΔD becomes large in cases where the gear ratio γ is the minimum gear ratio γmin and the maximum gear ratio γmax. In the example illustrated in FIG. 7, specifically, the misalignment amount ΔD becomes approximately 0.5 when the gear ratio γ is the minimum gear ratio γmin (γ=0.4), and the misalignment amount ΔD becomes approximately 0.6 when the gear ratio γ is the maximum gear ratio γmax (γ=2.4)

Figure 8A:
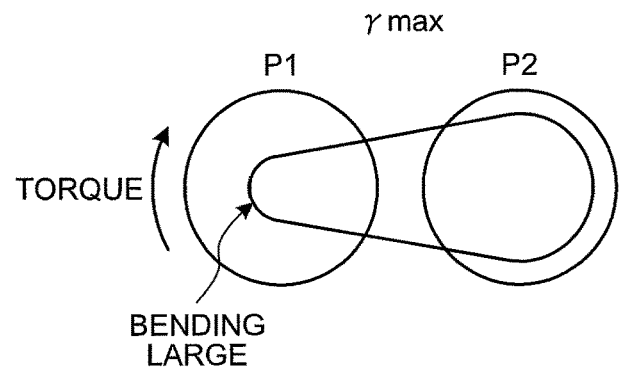
FIG. 8A is a schematic side view illustrating a state of the transmission belt in a case where a gear ratio of the belt-type continuously variable transmission is maximum.
Figure 8B:
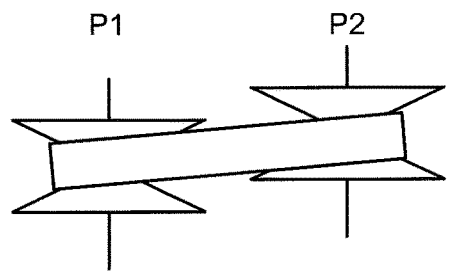
FIG. 8B is a schematic top view of the transmission belt in the case of FIG. 8A.
Figure 8C:
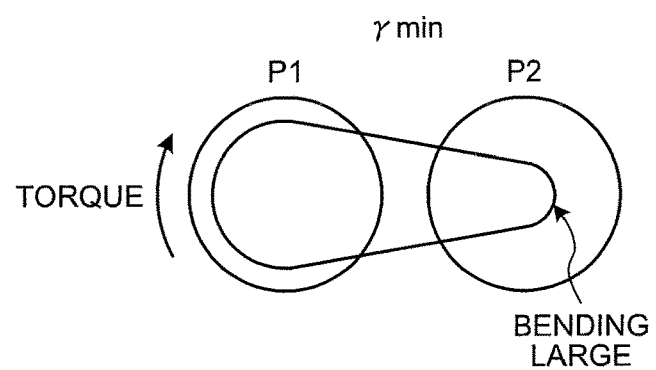
FIG. 8C is a schematic side view illustrating the state of the transmission belt when the gear ratio of the belt-type continuously variable transmission is minimum.
Figure 8D:
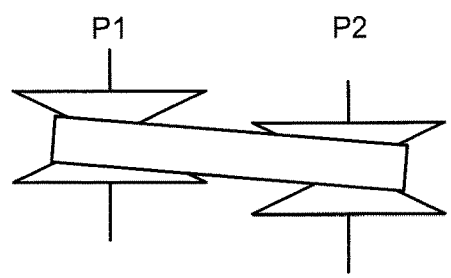
FIG. 8D is a schematic top view of the transmission belt in the case of FIG. 8C.

When the gear ratio γ in the belt-type continuously variable transmission CVT is the maximum gear ratio γmax, the pulley groove Pv in the driving pulley P1 illustrated in FIGS. 1A and 1B becomes large, whereas the pulley groove Pv in the driven pulley P2 becomes small. In this case, as illustrated in FIGS. 8A and 8B, the winding diameter of the transmission belt 1 in the driving pulley P1 decreases, whereas the winding diameter of the transmission belt 1 in the driven pulley P2 increases. On the other hand, when the gear ratio γ in the belt-type continuously variable transmission CVT is the minimum gear ratio γmin, the pulley groove Pv in the driving pulley P1 illustrated in FIG. 1 becomes small, whereas the pulley groove Pv in the driven pulley P2 becomes large. In this case, as illustrated in FIGS. 8C and 8D, the winding diameter of the transmission belt 1 in the driving pulley P1 increases, whereas the winding diameter of the transmission belt 1 in the driven pulley P2 decreases.

The driving pulley P1 receives a torque from an engine of a vehicle (both are not illustrated) and transmits the torque to the driven pulley P2 through the transmission belt 1. When the torque is transmitted from the driving pulley P1 to the driven pulley P2, the torque is transmitted via the elements 13 interposed by the driving pulley P1 which is a part of the transmission belt 1 wound around the driving pulley P1. That is, when the gear ratio γ is the maximum gear ratio γmax, bending of the transmission belt 1 wound around the driving pulley P1 becomes large, and the number of elements 13 used for transmitting the torque in the driving pulley P1 significantly decreases as compared with the case of the minimum gear ratio γmin. Therefore, when the gear ratio γ is the maximum gear ratio γmax, the winding diameter of the driving pulley P1 is less than that of the minimum gear ratio γmin, so that high hydraulic pressure must be applied to the sheave of the driving pulley P1 in order to transmit the torque. Furthermore, since the bending of the hoop 12 becomes large, a stress of the hoop 12 also increases. That is, when the gear ratio γ is the maximum gear ratio γmax, not only the misalignment amount ΔD is the maximum but also a load in the hoop 12 is high.

Therefore, in this embodiment, it is preferable to prevent the hoop 12 from being in contact with the inner wall surfaces 16e and 17e of the first pillar portion 16 and the second pillar portion 17, respectively, in a case of the maximum gear ratio γmax at which the misalignment amount ΔD is a local maximum and the high load is applied to the hoop 12. For this purpose, in a state of FIG. 5, it is preferable to make a portion with which a side end of the hoop 12 is highly likely to come into contact smoother. In other words, it is preferable to have the curved shape in which the shape in the surface direction of the saddle surface 15 on the inner wall surfaces 16e and 17e is the curved shape. In the example of FIG. 5, the side on the front surface 14f in the inner wall surface 16e of the first pillar portion 16 is made a smooth curved surface shape and the side of the rear surface 14g on the inner wall surface 17e of the second pillar portion 17 is made a smooth curved surface shape. This makes it possible to reduce the contact of the hoop 12 with the inner wall surfaces 16e and 17e of the first pillar portion 16 and the second pillar portion 17, respectively, in the case of the maximum gear ratio γmax, and even in a case of contact, it is possible to inhibit further stress from being generated in the hoop 12 to apply the load.

Furthermore, even in the case of the minimum gear ratio γmin at which the misalignment amount ΔD is the local maximum, it is preferable to prevent the side ends of the hoop 12 from being in contact with the inner wall surfaces 16e and 17e of the first pillar portion 16 and the second pillar portion 17, respectively. For this purpose, it is preferable to make the portion with which the hoop 12 is highly likely to come into contact smooth even in the state of FIGS. 8C and 8D in which the misalignment of FIG. 5 occurs on the opposite side. In the example of FIG. 5, the side on the front surface 14f in the inner wall surface 17e of the second pillar portion 17 is made a smooth curved surface shape and the side of the rear surface 14g in the inner wall surface 16e of the first pillar portion 16 is made a smooth curved surface shape. This makes it possible to reduce the contact of the hoop 12 with the inner wall surfaces 16e and 17e in the case of the minimum gear ratio γmin as well, and even in a case of contact, it is possible to inhibit further stress from being generated in the hoop 12 to apply the load.

Herein, when the gear ratio γ is the minimum gear ratio γmin, the load applied to the transmission belt 1 is not large as compared with the case of the maximum gear ratio γmax. Therefore, as described above, the first curvature radius R1 on the side of the front surface 14f is made greater than the second curvature radius R2 on the side of the rear surface 14g on the inner wall surface 16e (R1>R2). In addition, the fourth curvature radius R4 on the side of the front surface 14f is made less than the third curvature radius R3 on the side of the rear surface 14g on the inner wall surface 17e (R3>R4).

Modified Embodiment

Figure 9:
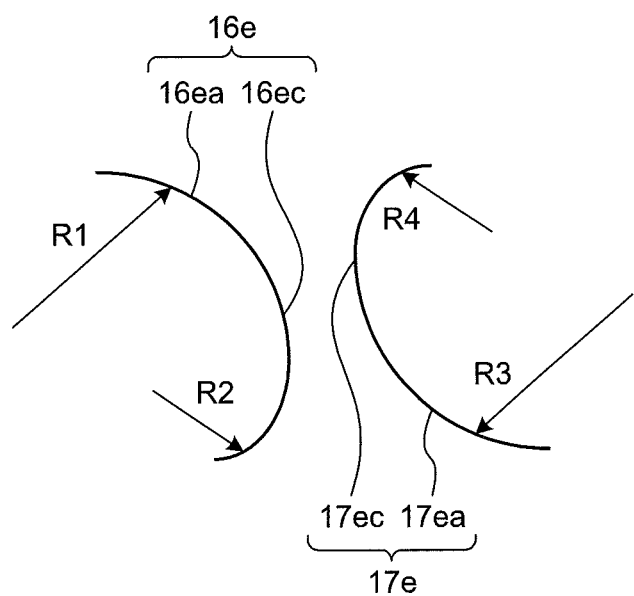
FIG. 9 is a schematic diagram illustrating shapes of the inner portion of the first pillar portion and the second pillar portion according to a modified example of the present disclosure.

Next, a modified embodiment is described. FIG. 9 is a schematic diagram illustrating shapes of inner portions of the first pillar portion 16 and the second pillar portion 17 according to the modified embodiment. As illustrated in FIGS. 5 and 9, an inner wall surface 16e of the inner portion of the first pillar portion 16 is formed of a first curved portion 16ea and a second curved portion 16ec which are continuously and smoothly formed. That is, the inner wall surface 16e of the inner portion of the first pillar portion 16 is formed only of the curved portions. In an element 13, the first curved portion 16ea is provided on a side of a front surface 14f and the second curved portion 16ec is provided on a side of a rear surface 14g. Similarly, an inner wall surface 17e of the inner portion of the second pillar portion 17 is formed of a third curved portion 17ea and a fourth curved portion 17ec which are continuously and smoothly formed. That is, the inner wall surface 17e of the inner portion of the second pillar portion 17 is formed only of the curved portions. In the element 13, the third curved portion 17ea is provided on the side of the rear surface 14g and the fourth curved portion 17ec is provided on the side of the front surface 14f. Other configurations are similar to those in the embodiment described above.

According to one embodiment of the present disclosure described above, since the side of the front surface 14f in the inner wall surface 16e of the first pillar portion 16 is made a smooth curved surface shape and the side of the rear surface 14g in the inner wall surface 17e of the second pillar portion 17 is made a smooth curved surface shape, also when the gear ratio of the belt-type continuously variable transmission CVT is the maximum gear ratio γmax, it is possible to reduce the contact of the hoop 12 with the inner wall surfaces 16e and 17e of the first pillar portion 16 and the second pillar portion 17, respectively, and even at the time of contact, it is possible to inhibit further stress from being generated in the hoop 12, so that it is possible to inhibit further load from being applied to the hoop 12.

According to an embodiment, even when the gear ratio becomes the minimum gear ratio when using the transmission belt in the belt-type continuously variable transmission, contact of the single-line ring with the inner portion of the pillar portion can be suppressed, and even in the case of the contact, a load applied to the single-line ring may be suppressed from increasing.

According to an embodiment, even when the gear ratio becomes the minimum gear ratio when using the transmission belt in the belt-type continuously variable transmission, contact of the single-line ring with the inner portion of the pillar portion can be suppressed, and even in the case of the contact, a load applied to the single-line ring may be suppressed from increasing.

According to a transmission belt according to the present disclosure, it is possible to reduce contact of a pillar portion of an element with a side end of a single-line ring caused by misalignment in a transmission belt provided with the single-line ring because a possibility that a corner of the pillar portion is brought into contact with the single-line ring decreases also in a state in which the misalignment occurs in the single-line ring in a case where the transmission belt is used in a belt-type continuous variable transmission and a gear ratio becomes a maximum gear ratio especially, due to a portion in a curved shape provided on a front side on which a locking edge is provided on one end of an inner portion of the pillar portion and on a rear side on which the locking edge is not provided on the other end of the inner portion.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A transmission belt comprising:
   a plurality of elements, each element of the plurality of elements having a plate shape arranged sequentially in a ring manner; and
   a single-line ring having a belt shape configured to bind the plurality of elements together in a ring, each element of the plurality of elements includes pillar portions so that the single-line ring is inserted between the pillar portions and a locking edge, which is provided on one surface in a plate thickness direction of each respective element, indicating a boundary region from which a plate thickness of the respective element changes, wherein:
      the pillar portions have respective ends, which form an inner space between the ends so that the single-line ring is inserted in the inner space, the ends having portions in a curved shape each having a predetermined curvature radius along a plane parallel to the single-line ring, and
      the portions of the ends of the pillar portions in the curved shape include a first portion, a second portion, and a third portion, the first portion being formed on a front side, where the locking edge is provided, at one end of the inner space, the second portion being formed on a rear side, where the locking edge is not provided, at another end of the inner space, the third portion being formed on the rear side at the one end of the inner space, and a curvature radius of the first portion is greater than a curvature radius of the second portion.

2. The transmission belt according to claim 1, wherein each of the portions in the curved shape further includes a portion having a linear shape along the plane parallel to the single-line ring.

3. A transmission belt comprising:
   a plurality of elements, each element of the plurality of elements having a plate shape arranged sequentially in a ring manner; and
   a single-line ring having a belt shape configured to bind the plurality of elements together in a ring, each element of the plurality of elements includes pillar portions so that the single-line ring is inserted between the pillar portions and a locking edge, which is provided on one surface in a plate thickness direction of each respective element, indicating a boundary region from which a plate thickness of the respective element changes, wherein:

the pillar portions have respective ends, which form an inner space between the ends so that the single-line ring is inserted in the inner space, the ends having portions in a curved shape each having a predetermined curvature radius along a plane parallel to the single-line ring, and the portions of the ends of the pillar portions in the curved shape include a first portion, a second portion, and a fourth portion, the first portion being formed on a front side, where the locking edge is provided, at one end of the inner space, the second portion being formed on a rear side, where the locking edge is not provided, at another end of the inner space, the fourth portion being provided on the front side at the another end of the inner space, and a curvature radius of the fourth portion is less than a curvature radius of a third portion.

4. The transmission belt according to claim 3, wherein each of the portions in the curved shape further includes a portion having a linear shape along the plane parallel to the single-line ring.

\* \* \* \* \*